United States Patent
Osorio Martinez et al.

(10) Patent No.: US 11,885,300 B2
(45) Date of Patent: Jan. 30, 2024

(54) HELICAL STRAKE SET TO REDUCE VORTEX INDUCED VIBRATIONS OF AN EOLIC TOWER

(71) Applicant: Siemens Gamesa Renewable Energy Innovation & Technology S.L., Sarriguren (ES)

(72) Inventors: Juan Manuel Osorio Martinez, Burlada (ES); Vicente Señas Perez, Navarra (ES); Jesus Angel Yabar Basterra, Pamplona (ES)

(73) Assignee: Siemens Gamesa Renewable Energy Innovation & Technology S.L.

( * ) Notice: Subject to any disclaimer, the term of this patent is extended or adjusted under 35 U.S.C. 154(b) by 130 days.

(21) Appl. No.: 17/616,364

(22) PCT Filed: Mar. 11, 2020

(86) PCT No.: PCT/EP2020/056441
§ 371 (c)(1),
(2) Date: Dec. 3, 2021

(87) PCT Pub. No.: WO2020/253999
PCT Pub. Date: Dec. 24, 2020

(65) Prior Publication Data
US 2022/0316448 A1    Oct. 6, 2022

(30) Foreign Application Priority Data

Jun. 17, 2019  (EP) .................................. 19380011

(51) Int. Cl.
*F03D 13/40*  (2016.01)
*F03D 13/20*  (2016.01)

(52) U.S. Cl.
CPC ............. *F03D 13/40* (2016.05); *F03D 13/20* (2016.05); *F05B 2240/122* (2013.01);
(Continued)

(58) Field of Classification Search
CPC .... F03D 13/40; F03D 13/20; F05B 2240/122; F05B 2240/912; F05B 2250/11;
(Continued)

(56) References Cited

U.S. PATENT DOCUMENTS 4,722,367 A  *  2/1988  Swink .................... F15D 1/10
                                                      138/144
9,523,456 B1 * 12/2016 Allen ...................... E21B 17/22
(Continued)

FOREIGN PATENT DOCUMENTS

CN       102182645 A    9/2011
CN       202100212 U    1/2012
(Continued)

OTHER PUBLICATIONS

CN-206785562-U (Year: 2017).*
(Continued)

*Primary Examiner* — Mickey H France
(74) *Attorney, Agent, or Firm* — Schmeiser, Olsen & Watts LLP

(57) ABSTRACT

Provided is a helical strake set to reduce vortex induced vibrations of a tower, intended to be transported unassembled in a container, including a plurality of identical attachable segments, wherein each segment includes a main body of hollow pyramidal configuration including a wide polygonal end a narrow polygonal end and a narrow polygonal portion firmly attached to the narrow polygonal end, and each segment further including a cap including a wide polygonal portion able to fit in the wide polygonal end by a fastening element, wherein all main bodies and caps are able to be piled in one onto another in a container yielding a significant reduction in seaborn transport volume and later assembled on site to reduce vortex induced vibrations of a tower.

8 Claims, 5 Drawing Sheets

(52) U.S. Cl.
CPC ..... *F05B 2240/912* (2013.01); *F05B 2250/11* (2013.01); *F05B 2250/21* (2013.01); *F05B 2250/25* (2013.01); *F05B 2260/02* (2013.01); *F05B 2260/964* (2013.01)

(58) Field of Classification Search
CPC .............. F05B 2250/21; F05B 2250/25; F05B 2260/02; F05B 2260/964; Y02E 10/72; Y02E 10/728
See application file for complete search history.

(56) References Cited

U.S. PATENT DOCUMENTS

| | | | |
|---|---|---|---|
| 9,567,745 | B2 | 2/2017 | Moeller et al. |
| 9,869,128 | B1 * | 1/2018 | Allen ........................ E21B 17/01 |
| 2006/0290140 | A1 | 12/2006 | Yoshida |
| 2014/0086772 | A1 | 3/2014 | Olsen |
| 2016/0160499 | A1 * | 6/2016 | Moeller .................. F03D 13/40 52/698 |

FOREIGN PATENT DOCUMENTS

| | | | |
|---|---|---|---|
| CN | 103392070 | A | 11/2013 |
| CN | 103485732 | A | 1/2014 |
| CN | 105673351 | A | 6/2016 |
| CN | 206785562 | U | * 12/2017 |
| CN | 206785562 | U | 12/2017 |
| CN | 207795943 | U | 8/2018 |
| CN | 108825444 | A | 11/2018 |
| CN | 109058050 | A | 12/2018 |
| CN | 109578218 | A | 4/2019 |
| DE | 202018003615 | U1 | 8/2018 |
| WO | 2017013145 | A1 | 1/2017 |
| WO | WO-2020125886 | A1 * | 6/2020 ............. F03D 13/20 |

OTHER PUBLICATIONS

PCT International Search Report & Written Opinion dated May 13, 2020 corresponding to PCT International Application No. PCT/EP2020/056441.

* cited by examiner

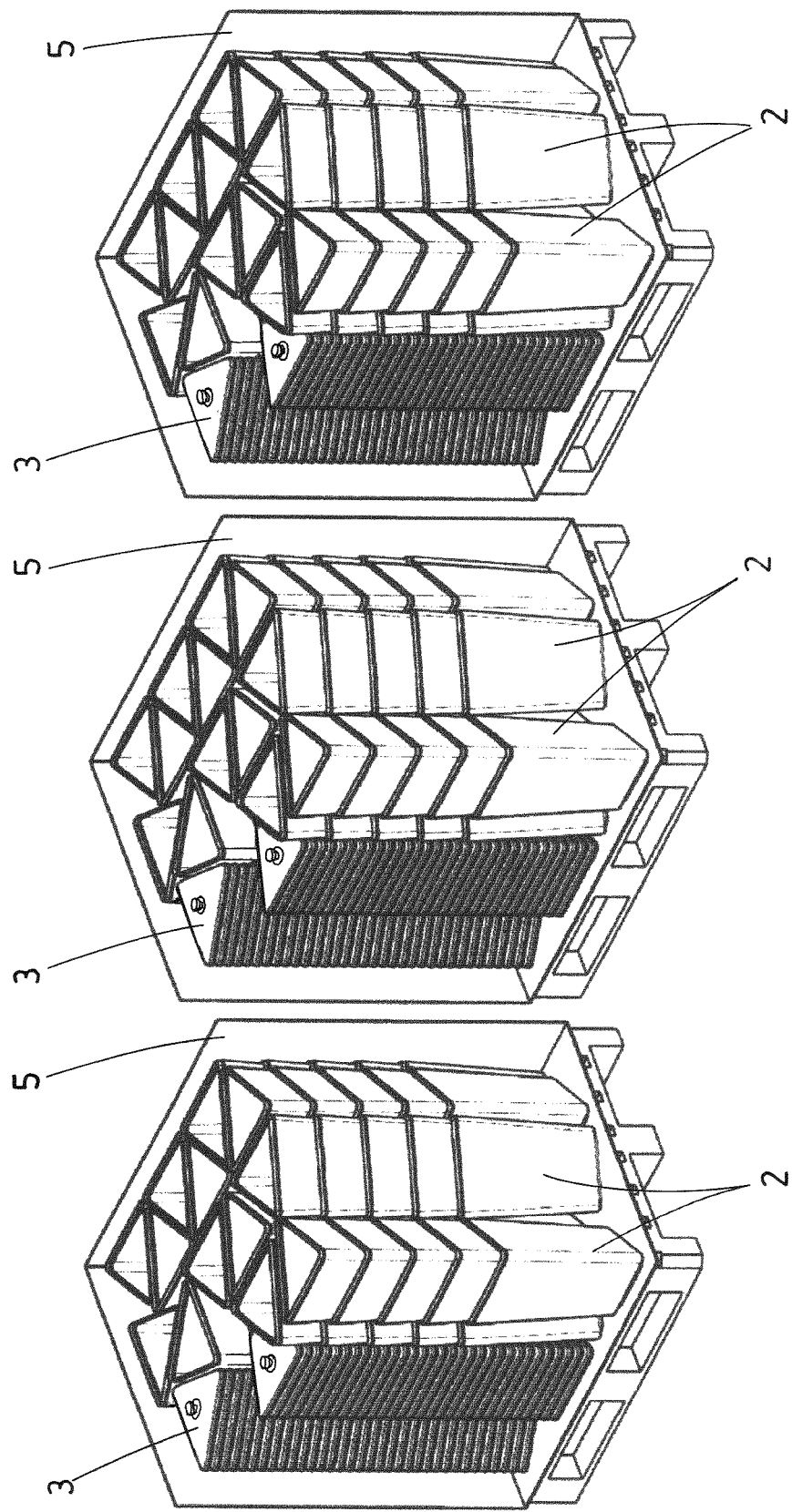

HELICAL STRAKE SET TO REDUCE VORTEX INDUCED VIBRATIONS OF AN EOLIC TOWER

CROSS-REFERENCE TO RELATED APPLICATIONS

This application claims priority to PCT Application No. PCT/EP2020/056441, having a filing date of Mar. 11, 2020, which is based off of EP Application No. 19380011.7, having a filing date of Jun. 17, 2019, the entire contents both of which are hereby incorporated by reference.

FIELD OF TECHNOLOGY

The following is included in the technical field of helical strakes to reduce vortex induced vibrations of a tower, especially for wind turbine towers experiencing vortex amplification accelerations and resonance. More in particular, it relates to a helical strake set comprising attachable segments intended to be arranged and transported in a seaborne container to be later assembled and installed on the tower, achieving great volume reduction and space optimization during transport.

BACKGROUND

Wind turbines comprise a tower and a nacelle placed on top of that tower, whereby the nacelle is equipped with a rotor which rotates due to the impact of wind. In the nacelle, the rotational movement of the rotor is used to generate electric power.

Large wind turbine towers often comprise a number of tower segments, e.g., made of steel, which when assembled together form the complete wind turbine tower. The assembly of large wind turbine towers in particular under offshore conditions, but also onshore, consumes a lot of time, effort, and financial resources.

Thereby, lifting the tower in segments or as a whole to the assembly site, i.e. to a foundation on which the tower is to rest to be later equipped with the nacelle and the rotor, poses several problems. One of said problems is that the tower is subject to enormous vibrations induced by the wind coming from its side. Such side winds may have high velocities as can be expected especially in areas in which wind turbines are operated.

The above-indicated vibrations are commonly called Vortex induced vibrations (VIV) which can be the result of alternating Vortex shedding around the tower in strong wind conditions. This shedding results in alternating pressure differences over the wind turbine tower's cross-section perpendicular to the wind direction. In case the shedding frequency is close to the natural frequency of the wind turbine tower, alternating shedding is regular, and the amplitude is large enough compared to the structural damping of the tower, VIV can occur which could cause damage to the wind turbine tower or reduce its fatigue life.

VIV have been known for a long time and several measures have been found of how to reduce these vibrations on readily installed tubular structures such as high chimney stacks.

One approach is to dampen the structure by increasing the weight on its top. Other approaches refer to streamline the cross-section of the structure by measures on its outer surface. Amongst these streamlining measures, a prominent one is that of the use of so-called helical strakes.

Current "helical strakes" are made from polystyrene foam. As a consequence, these triangular shaped foam "helical strakes" bear a significant volume and hence occupy several rows and space in maritime containers incurring in several problems such as higher transports costs, more containers required, logistics, etc.

SUMMARY

A helical strake set for reducing vortex induce vibration of a tower is disclosed herein with which it has been found that at least the above disadvantages relating to the conventional art solutions are mitigated.

More in particular, there is provided a helical strake set to reduce vortex induced vibrations of a tower, intended to be transported unassembled in a container, comprising a plurality of identical attachable segments, characterized in that each segment comprises:
- a main body of hollow pyramidal configuration comprising a wide polygonal end, a narrow polygonal end and a narrow polygonal portion able to rigidly attach to the narrow polygonal end and said narrow polygonal portion further comprises a first through hole,
- a cap comprising a wide polygonal portion able to fit in the wide polygonal end and further comprising a second though hole, wherein all main bodies and caps are able to be securely attached by at least one fastening element and are geometrically configured to be piled in one into the other in the container.

All segments are made of plastic and are manufactured by a blow molding process.

By means of these technical features a whole helical strake set can be assembled together by means of main bodies and caps in order to form a whole strake set required in the tower to reduce vortex induced vibrations thereof.

The wide polygonal end comprises two perimetral cavities and the wide polygonal portion comprises two perimetral ribs, wherein the perimetral ribs can fit in the perimetral cavities defining a first fasten element.

The narrow polygonal portion is manufactured as one piece together with the main body. Alternatively, it can be a similar but removable polygonal portion able to fit in the narrow polygonal end and to rigidly attach by fasten elements. For example, in this option, the narrow polygonal end of the main body can comprise narrow perimetral cavities and the wide polygonal portion of the narrow portion comprise perimetral ribs, wherein the perimetral projection ribs fit in the perimetral cavities defining the second fasten element for securely attaching a cap with the narrow polygonal end of a main body.

In yet another alternative, each cap comprises a wide polygonal portion able to fit in the wide polygonal end and a narrow polygonal portion protruding from the wide polygonal portion able to fit in the narrow polygonal end, In this embodiment, the same cap would be able to fit in the narrow polygonal end and into the wide polygonal end, comprising in itself the narrow polygonal portion protruding thereof, and further comprising fasten elements in each to attach to the narrow polygonal end and wide polygonal end.

As a consequence, all main bodies (2) and caps (3) are able to be piled in one into another in respectively in a container (5), yielding a significant volume reduction advantage for seaborn and onshore containers.

Alternatively, any fastening element known could be used to securely attach the caps with main bodies forming a helical strake set securely fastened.

These helical strakes set are for wind turbine's towers experiencing vortex amplification accelerations or transitionally while are to be lifted and mounted. Sometimes these can be used only during installation as nacelle weight can later dampen the structure and avoid resonance with the shedding frequency.

Note the geometry of segments disclosed above allows each cap and main bodies to be piled one into another in a container reducing the space required. The features disclosed have been found to reduce the transport volume at least 60% in relation to a similar helical strake section made by polystyrene foam. This is a significant advantage in space yield, costs and logistics.

The wide polygonal end and the narrow polygonal end have a triangular shape. As a consequence, main bodies and caps can be compactly arranged in pillars forming parallelepiped shapes for optimizing the container's space.

A whole helical strake standard set can be transported in 3 containers, each of approximately 1.2×0.8 m, yielding a total volume of approximately 3-5 m³.

Note that standard containers for an equivalent foam polystyrene helical strakes section requires at least a 10 m³ container to be transported.

Furthermore, the cap can comprise a hollow knob protruding from the through hole and the narrow portion comprise a equivalent hollow knob protruding from the respective through hole.

A whole helical strake standard set is assembled in the tower by means of a penetrating rope going through each hollow knob and hence going through each segment and through the whole helical strake set mounted around the tower.

BRIEF DESCRIPTION

Some of the embodiments will be described in detail, with reference to the following figures, wherein like designations denote like members, wherein:

FIG. 5 shows a perspective view of an embodiment of a helical strakes set being transported in three containers;

Figure 6A:
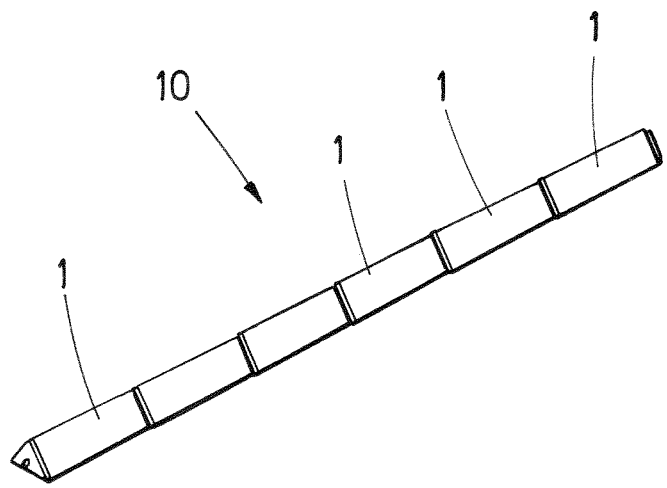
Figure 6B:
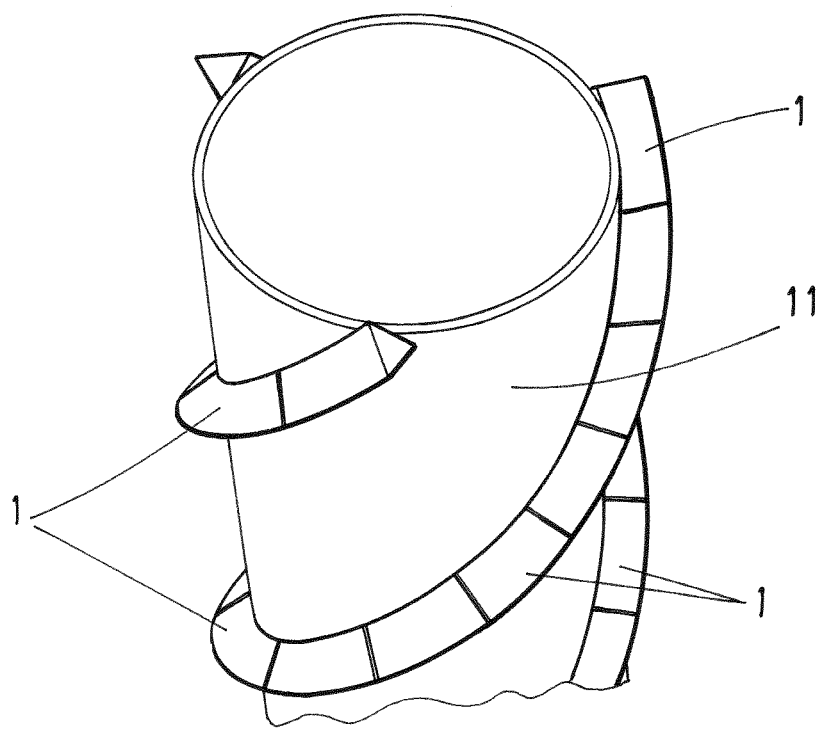

FIG. 6a. shows a schematic view of the helical strake assembled in destination; and FIG. 6b shows the helical strake set arrange in streamline around the cross section of the tower outer surface to reduce vortex induce vibrations.

DETAILED DESCRIPTION

A detailed explanation of an example of an embodiment of the present invention is provided below, with the aid of the aforementioned figures.

Figure 1:
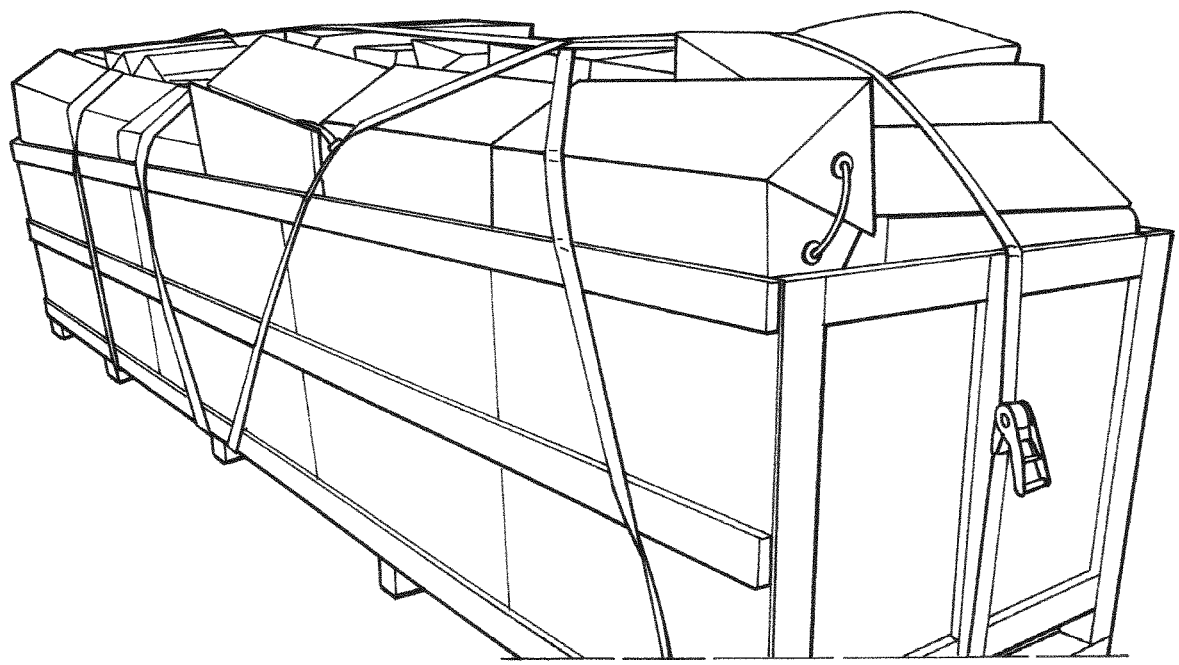
FIG. 1 shows a conventional art representation of the way of transport of conventional polystyrene foam helical strakes.

FIG. 1 illustrates a container packed with helical strakes made of polystyrene foam representing a conventional art helical strake set way of transport. It can be clearly seen a significant volume is needed to transport these helical strakes set, requiring containers of an approximate volume of 10 m³.

Figure 2:
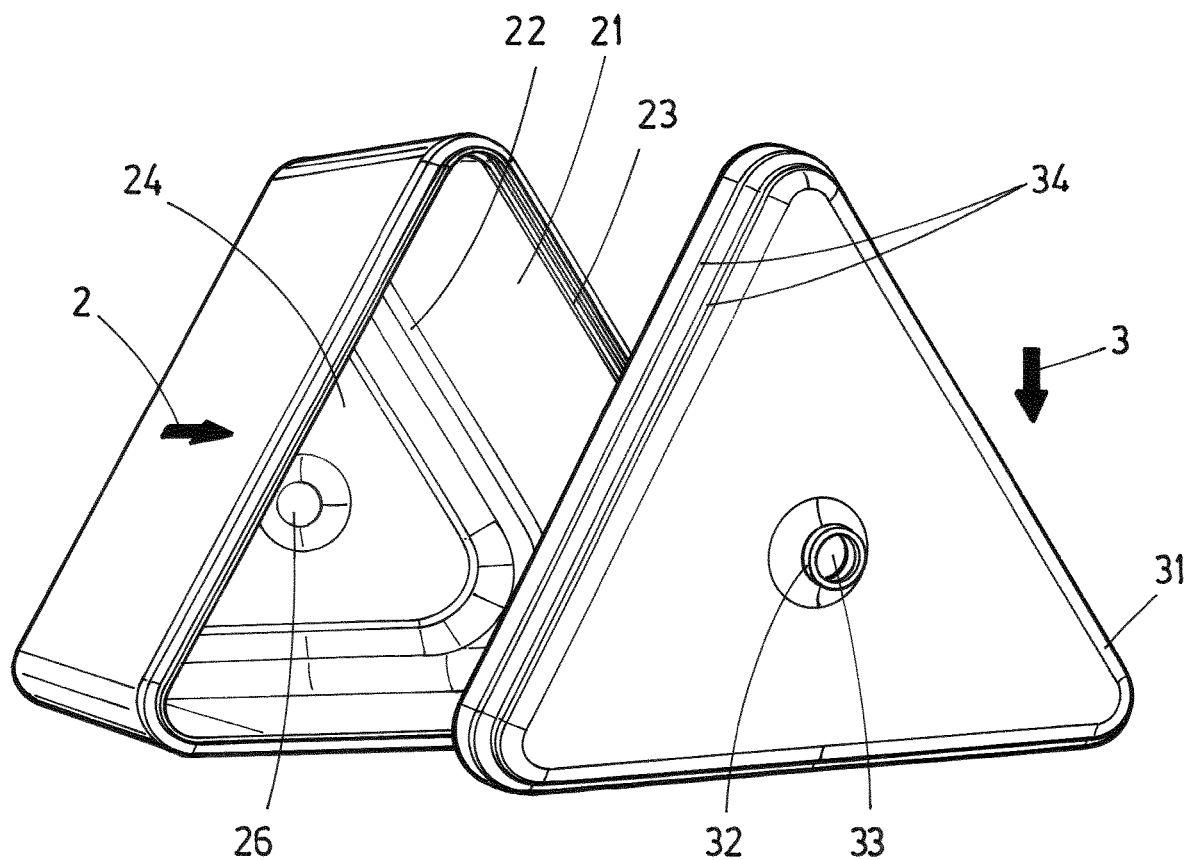
FIG. 2 shows a perspective view of an unattached segment of the helical strakes set according to an embodiment of the invention.

FIG. 2 illustrates a perspective view of an unattached segment (1) of a helical strake set (10) according to an embodiment of the invention.

It is clearly shown that each segment (1) comprises a main body (2) of hollow pyramidal configuration with a wide polygonal end (21) and a narrow polygonal end (22).

In an embodiment, the main body (2) further comprises a narrow polygonal portion (24) fitted in the narrow polygonal end (22) forming one rigid piece with said main body (2) and comprising a first through hole (26). In an alternative embodiment, said polygonal portion (24) can be removable and attachable to the narrow polygonal end (22) by fastening elements.

FIG. 2 also illustrates that each segment (1) further comprises a cap (3), wherein said cap (3) comprises a wide polygonal portion (31) able to fit in the wide polygonal end (21) and further comprising a second though hole (33) from where a second hollow knob (32) protrudes thereof.

As a consequence, with this configuration all main bodies (2) and caps (3) are able to be piled in one into another in respectively in a container (5), yielding a significant volume reduction advantage for seaborn and onshore containers. Additionally, all main bodies (2) and caps (3) are able to be securely attached by at least one fastening and a whole helical strake set (10) to reduce vortex induced vibrations of a tower can be assembled together by means of a rope inserted through the first and second through holes (26,33) and mounted around said tower (11).

In an embodiment the wide polygonal end (21) and the narrow polygonal end (22) have a triangular shape as is shown in FIG. 2

Figure 3:
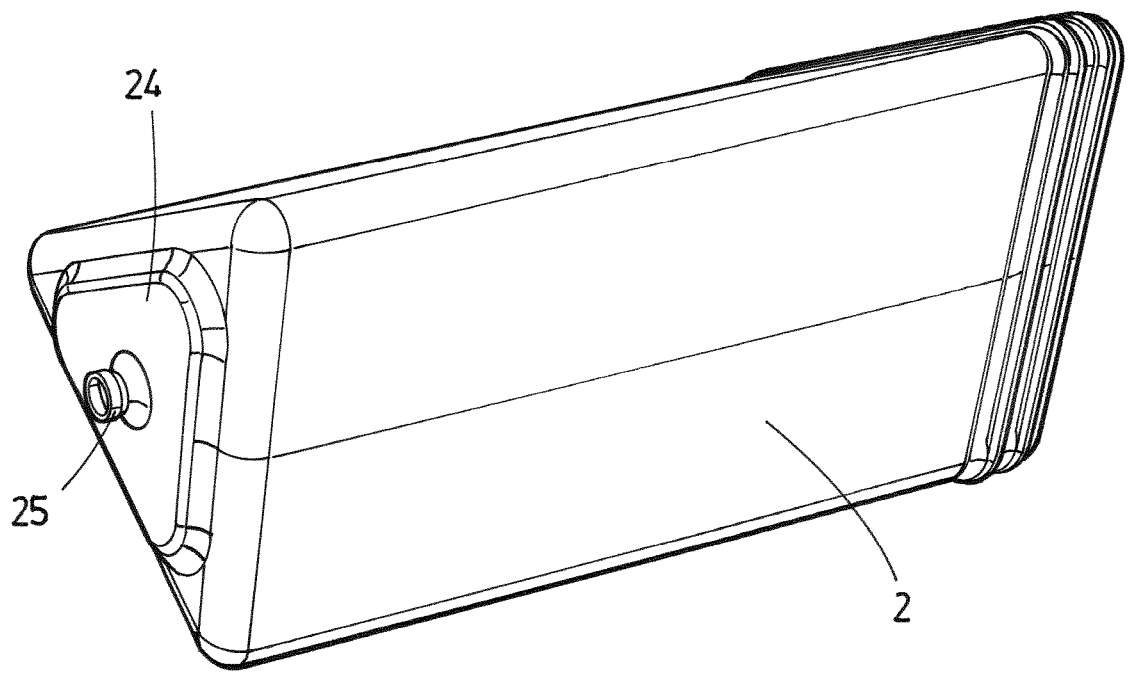
FIG. 3 shows an attached segment of the helical strakes set according to an embodiment of the invention.

FIG. 3 illustrates an attached segment (1) showing the cap (3) properly attached to the main body (2) forming one attached segment (1) of a plurality of identical attachable segments (1) that establish a set of helical strakes set (10) able to be used once mounted, to reduce vortex induced vibrations of a tower (11), especially wind turbine towers experiencing vortex amplification accelerations and resonance.

Figure 4:
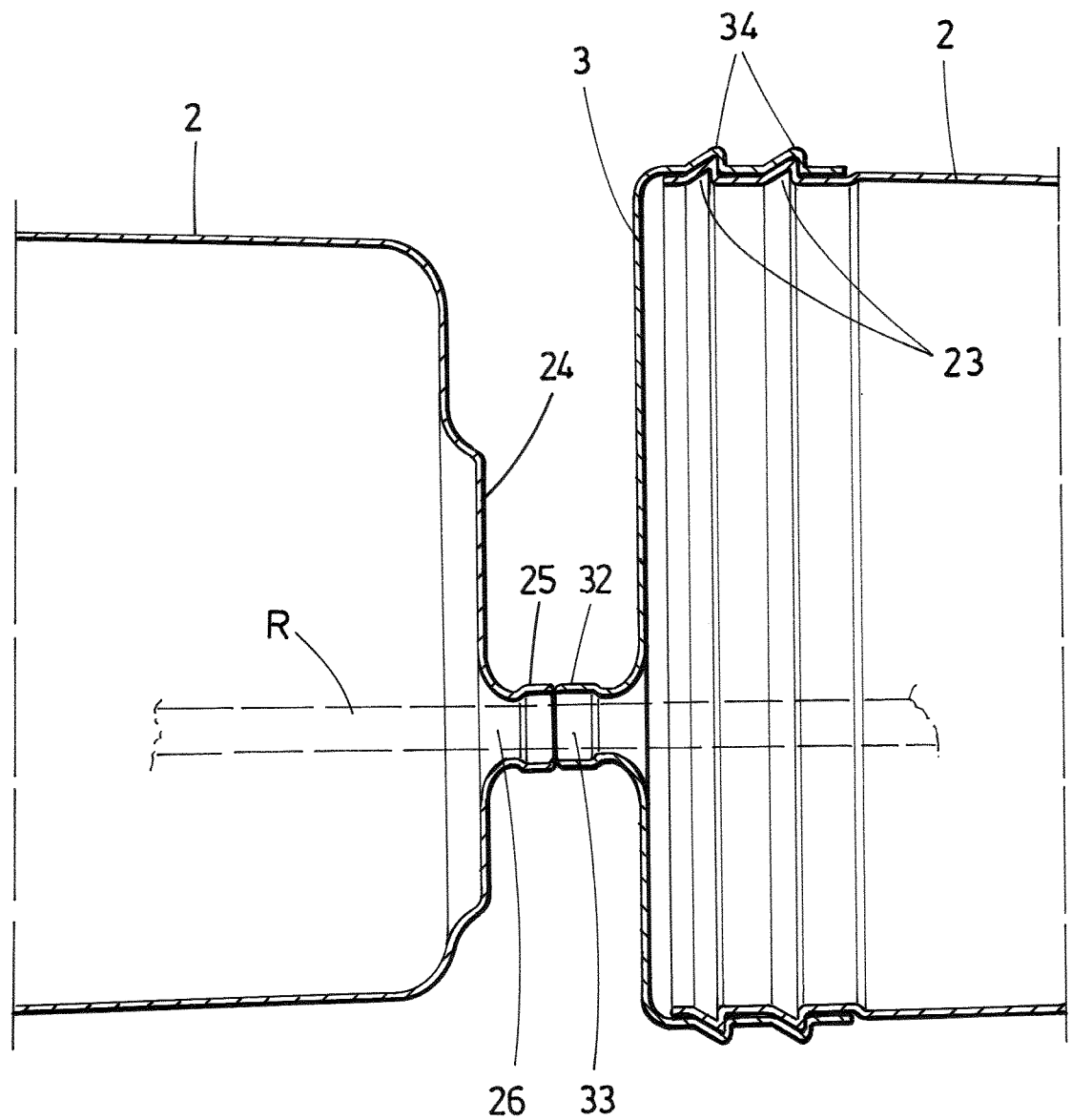
FIG. 4 shows a lateral view of the main body securely attached to the cap and two segments fastened together by means of an internal rope according to an embodiment of the invention.

FIG. 4 shows a lateral view of the main body (2) securely attached to the cap (3) and two segments (1) fastened together by means of an internal rope (R) according to an embodiment of the invention. More in particular, it shows that in an embodiment the wide polygonal end (21) of the main body (2) comprises two wide perimetral cavities (23) and the wide polygonal portion (31) of the cap (3) comprises perimetral ribs (34), wherein the perimetral ribs (34) can fit in the perimetral cavities (23) defining a first fasten element for securely and firmly attaching a cap (2) to the wide end (21) of the main body (2).

FIG. 5 illustrates a perspective view of an embodiment of a helical strakes set being transported in containers (5). Accordingly, with the technical features described, main bodies (2) and caps (3) can be vertically piled in into one another in the containers (5) for transport. More in particular, are compactly arranged in pillars forming parallelepiped shapes in the rectangular or squared container (5).

In the embodiment described in FIG. 5, three containers of 1.2×0.8 m are able to transport a whole helical strakes standard set yielding a total volume of approximately 3-5 m³. Note, that the equivalent set of helical strakes in the conventional art illustrated in FIG. 1, containers of 10 m³ are required.

As a consequence, once the helical strakes set (10) arrive to the required wind turbine destination, all segments (1) can be mounted together forming a helical strake set (10) as shown in FIG. 6a and streamline the cross-section of the tower (11) on its outer surface, as it is illustrated in FIG. 6b.

In an embodiment, each segment (1) is of plastic manufactured by blow molding. This can greatly reduce costs, achieve required geometries for transport savings, and increase the durability of the helical strakes set (10) in comparison to polystyrene foam.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A helical strake set to reduce vortex induced vibrations of a tower, intended to be transported unassembled in a container, having a plurality of identical attachable segments, wherein each segment comprises:
 a main body of hollow pyramidal configuration comprising a wide polygonal end, a narrow polygonal end and a narrow polygonal portion able to rigidly attach to the narrow polygonal end and the narrow polygonal portion further comprises a first through hole, and
 a cap comprising a wide polygonal portion able to fit in the wide polygonal end and further comprising a second though hole,
 wherein all main bodies and caps can be securely attached by at least one fastening element and are geometrically configured to be piled in one into the other in the container.

2. The helical strakes according to claim 1, wherein the wide polygonal end comprises two perimetral cavities and the wide polygonal portion comprises two perimetral ribs, wherein the perimetral ribs are able to fit in the perimetral cavities.

3. The helical strakes according to claim 1, wherein the narrow polygonal portion comprises a first hollow knob protruding from the first through hole.

4. The helical strakes set according to claim 1, wherein the cap comprises a second hollow knob protruding from the second through hole.

5. The helical strakes set according to claim 1, wherein the wide polygonal aperture and the narrow polygonal end have a triangular shape.

6. The helical strakes according to claim 1, wherein piled main bodies and caps with triangular shape can be compactly arranged in pillars forming parallelepiped shapes in the container.

7. The helical strakes according to claim 1 wherein each segment is made of plastic manufactured from a blow molding process.

8. The helical strakes according to claim 1, wherein a full helical strake set is assembled in 3-5 $m^3$ containers.

* * * * *